Patented Aug. 12, 1924.

1,505,043

UNITED STATES PATENT OFFICE.

LEON LILIENFELD, OF VIENNA, AUSTRIA.

CELLULOSE ETHER AND PROCESS OF MAKING SAME.

No Drawing. Application filed June 10, 1922. Serial No. 567,430.

*To all whom it may concern:*

Be it known that I, LEON LILIENFELD, citizen of the Republic of Poland, residing at Vienna, Austria, have invented certain new and useful Improvements in Cellulose Ether and Processes of Making Same, of which the following is a specification.

For many technical purposes, such for example as for the making of artificial filaments and threads (including artificial silk), finishing materials, and the like, those ethyl derivatives of cellulose and its conversion products which are insoluble in water at room temperature or only swell slightly therein, but which swell in colder water, or even which dissolve in very cold water, have been demonstrated to be valuable in many cases.

Such ethyl derivatives of cellulose and a process of making the same, form the object of the present invention.

I have made the discovery that alkyl ethers of cellulose of excellent quality and in good yields, can be produced, starting from alkyl cellulose (such, for example as ethyl cellulose) which are soluble in water at room temperature, or from reaction mixtures which contain such alkyl celluloses, by converting these alkyl celluloses which are soluble in water at room temperature into alkyl celluloses which are not soluble in water at 16° C., but which swell or are soluble in colder water, particularly below 10° C., by so calculating the content of the reaction mixture in alkali that the quantity of alkali amounts to not less than one-tenth and not more than one-fourth of the quantity of the water present in the reaction mixture.

The following examples may represent the proportions (the parts are by weight):

If for example a reaction mixture contains 2 to 5 parts of water to one part (calculated as the dry substance) of an ethyl cellulose soluble in water at 16° C., then according to the present invention the caustic alkali content of the reaction mixture should be between 0.3 and 1 part. If for example the reaction mixture contains 5 to 10 parts of water to 1 part of the ethyl-cellulose soluble in water at 16° C. (calculated as the dry substance), then according to the present invention not less than 0.75 and not more than 2.5 parts of caustic alkali are to be contained in the reaction mixture. If for example the reaction mixture contains 10 to 20 parts of water to 1 part of the ethyl cellulose soluble in water at 16° C. (calculated as the dry substance), then the reaction mixture is to contain not less than 2 and not more than 5 parts of caustic alkali.

For executing the process, in the first place, an ethyl ether of cellulose or of a conversion product of the same, soluble in water at 16° C. is made, which for example may be accomplished by ethylation of alkali cellulose or a conversion product or derivative of cellulose or the like soluble in alkali by means of diethyl sulfate or an ethyl halid, in known manner. (See for example, Austrian Patent No. 78,217, Examples I to VI and Example XI and the corresponding examples in U. S. Patent 1,188,376.) This ethyl cellulose, soluble in water at 16° C., may then be isolated and treated with water and caustic alkali within the quantitative limits given above, and acted on by an ethylating agent (for example diethyl sulfate, ethyl chlorid, ethyl bromide, ethyl iodide, or the like). Or, in a modified form of the process, the crude reaction mixture containing the ethyl cellulose soluble in water at 16° C., or if desired after a previous elimination of a part of the water present in it, has so much caustic alkali (in solution or in solid form) added to it, as is needed to give a proportion of water to caustic alkali (taking into consideration any caustic alkali already present in reaction mixture which was not used up in the primary reaction) which lies within the quantitative limits stated above. Then (in either of the two cases) an ethylating agent (for example, diethyl sulfate or an ethyl halid) is added, and the mixture heated preferably to 40–150° C., for say 2–24 hours. (If di-ethyl sulphate is used as ethylating agent, the temperature may preferably be between about 40 and 60° C., whilst, if an ethyl halide is used the temperature may preferably be between 70 and 150° C.) In both cases the caustic alkali as well as the ethylating agent may be added all at once or in several portions, maintaining the said water to alkali ratio. The isolation of the ethyl ethers of cellulose, insoluble in water at 16° C., but swelling or even soluble in colder water, particularly in water below 10° C., is appropriately accomplished by placing the reaction mixture, either diluted with water or not, and either as it is, or after previous neutralization or acidification, on a filtering apparatus for example a filter press, a suction filter, a straining cloth, a centrifuge or the like, and then washing out the precipitate with water. As the cellulose ethers are insoluble in water at 16° C., water at this temperature or warmer water may be directly used for washing. After washing, the ethyl cellulose may be either immediately dried, or treated preliminarily with a dilute acid, again washed, and then dried. It usually forms a flocculent or pulverulent substance which does not dissolve in water at 15° C., but swells or dissolves in colder water, particularly in water at below 10° C. Whether it merely swells in cold water or dissolves, depends on the proportions of the water to the caustic alkali, as will appear from the following examples, which are given for the purpose of illustration, and not as defining the scope of the invention.

Example I.

2400 parts of an aqueous alkaline solution of a cellulose derivative or conversion product soluble in alkali are taken. This may be for example the cellulose xanthogenate described in Austrian Patent 82,837 or French Patent No. 474,793 or British Patent No. 14,339 of 1914 or U. S. Patent 1,379,351; or a purified viscose made according to an older process, for example a viscose purified by adding salts, or salts and acids, alcohols or the like; or a cellulose hydrate made by treatment of cellulose with hot alkali solution or with Schweizer's reagent and subsequent precipitation, or by heating the cellulose hydrate made from viscose according to the process of German Patent No. 155,745; or a hydrocellulose made by treating cellulose with strong sulfuric acid (amyloid, acid-cellulose, Guignet cellulose and the like) or another cellulose hydrate or the like. Such solution should contain 200 parts of the original cellulose (a quantitative determination of the content of cellulose or cellulose hydrate by precipitation with acid, collection on a weighed filter, and washing with water however usually shows that only about 120 to 150 parts of actual dry cellulose or a molecularly equivalent quantity of cellulose hydrate are present in the solution). The solution should also contain about 200 parts of caustic soda. This solution is slightly warmed, and then is treated while stirring with 600 parts of diethyl sulfate added in successive small portions, or as a slow stream. The addition of the latter may require 1 to 2 hours. Then if necessary it is heated very slowly on the water bath.

The preferred temperatures in this process during and after the addition of the diethyl sulfate, may, for example, be as follows:

| | Degrees centigrade. |
|---|---|
| Temperature of the water bath | 30 |
| Temperature of the solution of the cellulose derivative or conversion product (initial temperature) | 16 |
| Temperature after 15 minutes | 18 |
| Temperature after 30 minutes | 21 |
| Temperature after 45 minutes | 24 |
| Temperature after 1 hour | 27 |
| Temperature after 1 hour 15 minutes | 30 |
| Temperature after 1 hour 30 minutes | 33 |
| Temperature after 1 hour 45 minutes | 37 |
| Temperature after 2 hours | 41 |

During this period of time the whole of the diethyl sulfate has been incorporated with the reaction mixture.

| | Degrees centigrade. |
|---|---|
| Temperature after 2 hours 15 minutes | 45 |
| Temperature after 2 hours 30 minutes | 47 |
| Temperature after 2 hours 45 minutes | 48 |
| Temperature after 3 hours | 51 |
| Temperature after 3 hours 15 minutes | 55 |
| Temperature after 3 hours 30 minutes | 53 |
| Temperature after 3 hours 45 minutes | 50 |

The final reaction mixture (about 3,000 parts by weight) now forms a viscous, salve-like mass, which besides by-products contains the ethyl ether of cellulose, soluble in water at 16° C. This reaction mixture is now rubbed or kneaded up with 36 parts of pulverized caustic soda, and then if necessary, strained, whereupon 294 parts of diethyl sulfate are added, and it is heated on the water bath with forcible stirring. After the reaction mixture has reached about 80 to 90° C., the reaction is ended. A rather thin paste results, which is cooled to 60° C. and rubbed or kneaded or stirred with 72 parts of pulverized caustic soda. Then 294 parts of diethyl sulfate are again added, and it is heated on the water bath. The reaction again occurs between 70 and 90° C. A thin paste results. This paste is again cooled to 60° C., 72 parts of pulverized caustic soda are again stirred in, whereupon 294 parts of diethyl sulfate are again added, and the mixture is heated on the water bath. The reaction again occurs between 70 and 90° C., and leads to a thin paste. Now the addition of 72 parts of caustic soda and 294 parts of diethyl sulfate, with subsequent heating, is repeated twice more in the same manner, whereupon the reaction is ended. Altogether then 324 parts of caustic soda and 1470 parts of diethyl sulfate have been used.

The isolation of the finished cellulose ether is accomplished by diluting the reaction mixture with water, bringing it upon a filtering apparatus, and washing with water at room temperature to neutral reaction of the draining wash water. The precipitate is then taken from the filter, stirred up with dilute sulfuric or hydrochloric acid, again placed on a filtering apparatus, and washed free from acid with water at room temperature, and either dried in vacuo or in the air. After comminution, a white powder results, which is soluble in water at 1 to 5° C. upon kneading. This solution however congeals at 16° C. The body is insoluble in water at 16° C., or above, and does not swell therein. The body is further soluble in a whole series of volatile solvents such as for example alcohol, alcohol-benzol mixture, chloroform, chloroform-alcohol mixture, amyl acetate, glacial acetic acid, and the like. The solutions dry to a transparent, flexible skin. Such skins are insoluble in water at 16° C., but swell in water at 8 to 10° C., without decomposing, and dissolve in water at about 4° C. and below.

The yield obtained is about 100%, calculated on the weight of the cellulose employed as starting material.

The combustion of a sample of an ethyl ether of cellulose prepared according to this example, dried to constant weight, and containing 0.5% of ash, showed that the body (calculated for matter free from ash) contained: 54.26% C and 8.46% H. Calculated for $$n(C_{48}H_{36}O_{25}) = n(C_{36}H_{41}O_{25}.9C_2H_5): 54.23\% \text{ C}, 8.09\% \text{ H}.$$

The determination of the ethoxyl number showed that 23.64% of the substance consisted of ethyl groups.

*Example II.*

2400 parts of initial solution as in Example I are treated exactly as in Example I, with 600 parts of diethyl sulfate to produce an ethyl cellulose soluble in water at 16°. As soon as this is formed, the salve-like reaction mass is slowly incorporated with 325 parts of pulverized caustic soda, preferably with cooling and continuous kneading. After incorporation of the whole of the caustic soda, a whitish, salve-like paste results. It is treated with 350 parts of diethyl sulfate and heated on a water bath. The reaction occurs between 70 and 90° C. The resulting reaction paste is cooled to 60° C., again treated with 350 parts of diethyl sulfate and heated on the water bath. The reaction again occurs at between 70 and 90° C. A rather thin paste results. This paste is still twice more treated in the same manner with 350 parts each time of diethyl sulfate, with heating. Altogether, in this 325 parts of caustic soda and 1400 parts of diethyl sulfate are added.

The isolation of the finished cellulose ether is carried out, for example, exactly in the same manner as in Example I.

After drying and comminution, the ethyl cellulose consists of a white powder, which is not soluble in water at 16°, swells but little in water at 9 to 10°, and only shows a distinct swelling in water when the same is at 5 to 8° C., or colder. In water below 5° C., the swelling is very distinct but without a distinct solution occurring. The ethyl cellulose is, like that previously described, soluble in a whole series of volatile solvents (as given in Example I). On drying its solutions, a transparent, flexible film remains, which is only slightly swelled in water at 9 to 10°, and only in water at between 5 and 8° or colder, shows distinct swelling. In water at 1° C., it swells very strongly, and the destruction of the film results.

The formula represented by this example gives a yield of about 100% calculated on the weight of the cellulose employed as starting material.

The combustion of a sample of a product made in accordance with this example, dried to constant weight, and containing 0.61% of ash, showed that the substance (calculated for matter free from ash) contained: 54.91% C and 8.32% H. Calculated for $$n(C_{40}H_{70}O_{30}) = n(C_{24}H_{22}O_{20}.8C_2H_5): 55.04\% \text{ C}, 8.25\% \text{ H}.$$

The determination of the ethoxyl number showed that 26.3% of the body consisted of ethyl groups.

*Example III.*

2400 parts of the initial solution used in Examples I and II are converted as in Examples I and II, by treatment with 600–800 parts of ethyl sulfate, to produce an ethyl ether soluble in water at 16° C. After the heating which occurs similarly to that given in the two previously described examples, a whitish, cheesy paste results, which contains the ethyl cellulose soluble in water at 16°. Into the reaction paste, cooled to 16° C., are rubbed 62 parts of pulverized caustic soda, whereupon the temperature rises to 23° C. The white, cheesy mass formed is now treated with 260 parts of diethyl sulfate and slightly heated on the water bath. The resulting thick paste is cooled to 60° and treated with 62 parts of pulverized caustic soda with kneading, whereupon again 260 parts of diethyl sulfate are added, and the reaction mixture heated on the water bath. The reaction occurs at about 90° C. The resulting cheesy-flocculent paste is cooled to 30° C., whereupon it is slowly incorporated with 315 parts of pulverized caustic soda in small portions with kneading. The temperature during the rubbing in of the caustic soda rises to 45° C. Then three times more in the same manner, 260 parts of diethyl sulfate are added and it is heated on the water bath. Altogether 439 parts of caustic soda and 1300 parts of diethyl sulfate are added.

The isolation of the finished ethyl cellulose is accomplished in the same manner as given in the previously described examples.

After the drying and comminution, this product represents a white, powdery mass, which is soluble neither in water at 16° C. nor in water below 10°. It only shows a distinct swelling in very cold water, between 1 and 5°. The ethyl cellulose is, as that described previously, soluble in a whole series of volatile solvents. Its solution leaves behind a transparent, flexible film, which easily swells only in very cold water (for example 1 to 5° C.), without dissolving or disintegrating.

The yield obtained is about 100% calculated on the weight of the cellulose employed as starting material.

The combustion of a sample of an ethyl cellulose prepared according to this example, dried to constant weight, and containing 0.54% of ash, showed that the body (calculated for matter free from ash) contained: 53.96% C and 8.57% H.

Calculated for $n(C_{6}H_{10}O_{5})=n(C_{20}H_{11}O_{5}.9C_{2}H_{5})$: 54.23% C, 8.09% H.

The determination of the ethoxyl number showed that 24.4% of the substance consisted of ethyl groups.

Example IV.

2400 parts of the initial solution as in Examples I to III are treated with 600 parts of diethyl sulfate, and converted into the cellulose ether soluble in water at 16°. After the heating, which occurs similarly to that in the previous examples, a whitish, salve-like mass results, which contains the ethyl cellulose soluble in water at 16°. Then, at 50° C., 100 parts of caustic soda are incorporated with the mass. Into the salve-like mass formed, 200 to 360 parts of diethyl sulfate are then stirred, and it is heated on the water bath. The reaction occurs between 70 and 90° C. 100 parts of pulverized caustic soda are stirred into the resulting mass while at a temperature of about 80° C. Then another 200 to 360 parts of diethyl sulfate are added, and it is heated on the water bath. The reaction occurs again at between 70 and 90° C. The resulting paste is still three times more treated in the same manner with 100 parts of pulverized caustic soda and with 200 to 360 parts of diethyl sulfate, while in a heated state. Altogether 500 parts of caustic soda and 1000 to 1800 parts of diethyl sulfate are added.

The isolation of the ethyl cellulose formed is carried out in the same manner as in Examples I to III.

The finished ethyl cellulose consists, after drying and comminuting, of a white powder, which is insoluble in water at 16° C. as well as also in water at or below 10°. Only in cold water of 1 to 3° C. does it swell easily. It is soluble like the preceding in many organic solvents. Its solutions leave behind a transparent flexible film, which only softens in very cold water (for example 1 to 3° C.). The film becomes stretchy therein, without dissolving or disintegrating.

The yield obtained is about 100% calculated on the weight of the cellulose employed as starting material.

The combustion of a sample of a product made in accordance with this example, dried to constant weight, and containing 0.44% of ash, showed that the substance (calculated for matter free from ash) contained: 54.30% C and 8.48% H.

Calculated for $n(C_{6}H_{10}O_{5})=n(C_{20}H_{11}O_{5}.9C_{2}H_{5})$: 54.23% C, 8.09% H.

The determination of the ethoxyl number showed that 23.99% of the substance consisted of ethyl groups.

Example V.

2400 parts of the initial solution as in Examples I to IV are treated with 600 to 720 parts of diethyl sulfate exactly as in Examples I to IV. The resulting reaction paste, which contains the ethyl cellulose soluble in water at 16°, possibly after a previous straining, is evaporated either in an open vessel (evaporating dish or the like) or in vacuo (for example in a vacuum kneader) to 1080 to 1200 parts by weight, being constantly kneaded. Then the resulting mass, which may be rubbed to pieces, if necessary, is comminuted and rubbed up, whereupon 120 to 150 parts of pulverized caustic soda are rubbed in small portions, preferably with cooling, until complete homogeneity is secured. The resulting mass is now treated with 165 parts of diethyl sulfate and heated with stirring or kneading on the water bath. The heating is so conducted that the temperature which may be about 20° C. at the beginning, rises to 60° C. after about 40 minutes. Between 60 and 70°, the reaction occurs, and there results a soft doughy mass or a soft cheesy paste. The mass is then cooled to 30° C., again treated with 165 parts of diethyl sulfate and again slowly heated on the water bath. The reaction again occurs at 60-70° C.

The isolation of the finished ethyl cellulose is effected as in the previous examples. It is after drying, a white powder which, like the previous ones, is soluble in many organic solvents. The solution leaves behind a transparent and flexible film, which swells easily only in practically ice-cold water (for example 1° C.) and becomes stretchy therein, without dissolving or disintegrating.

The yield obtained is about 100% calculated on the weight of the cellulose employed as starting material.

The combustion of a sample of an ethyl ether of cellulose prepared in accordance with this example, dried to constant weight, and containing 0.67% of ash, showed that the body (calculated for matter free from ash) contained: 55.72% C and 8.85% H. Calculated for

$n(C_6H_{10}O_5) = n(C_6H_{11}O_5 \cdot 9C_2H_5)$: 55% C, 8.44% H.

The determination of the ethoxyl number showed that 28.7% of the body consisted of ethyl groups.

*Example VI.*

2400 parts of initial solution as in Example I are (optionally after having been incorporated with 500 to 1000 parts of a 30% caustic soda solution), placed in an autoclave, 800 to 900 parts of ethyl chloride are added, and the reacting mixture is kept at a temperature of 80–120° C. for 4 to 12 hours. The material in the autoclave is either stirred, or the autoclave kept in motion during the reaction. After the autoclave has cooled, the mass is, with cooling, rubbed up, or kneaded, or stirred with 320 to 400 parts of pulverized caustic soda, and placed again in the autoclave. Then 512–640 parts of ethyl chloride are added, the reaction mass heated to 100–130° C., and kept at this temperature for 4 to 14 hours.

The isolation of the finished ethyl ether of cellulose is carried out, for example, in the same manner as in the foregoing examples.

After drying and comminution, the ethyl cellulose represents a pulverulent mass, which is insoluble in water at 16° C., but shows by itself, or in the form of a film, a distinct swelling in water below 10° C., particularly below 5° C. It is soluble in a whole series of volatile organic solvents (as given in Example I).

*Example VII.*

200 parts of sulfite-cellulose are impregnated with 1000 parts of a 25–30% caustic soda solution and, preferably after standing for 1 to 3 days, placed in an autoclave. Then 400 to 480 parts of ethyl chloride are added, the autoclave heated, and the reaction mass kept for 4 to 12 hours at 80–110° C. The mass is stirred, or kept in motion during the reaction. After the autoclave has cooled, the mass is, with cooling, rubbed up with 120 to 160 parts of pulverized caustic soda, until complete uniformity is secured. The resulting mass is now placed back in the autoclave, 192 to 256 parts of ethyl chloride are added, and the mass heated to 100 to 140° C. and kept at this temperature for 5 to 12 hours.

The isolation of the finished ethyl cellulose is effected as in the previous examples. It is, after drying, a pulverulent or flocculent substance, which, like the previous ones, is soluble in many organic solvents. Its solutions leave behind films which are insoluble in water at 16° C., but which swell up in water below 10° C., particularly below 5° C.

Instead of di-ethyl sulphate or ethyl chloride other suitable alkylating agents may be employed, for example di-methyl sulphate, methyl chloride, ethyl iodide, ethyl bromide, or their higher homologues.

The process may also be carried out in such a manner that an alkyl ether of a cellulosic body soluble in water at 16° C., is prepared by means of one alkylating agent, whilst the conversion of this ether into the higher alkylated cellulose ether may be effected by an other alkylating agent. By using in the first stage and second stage different alkylating agents, for example in the first stage an inorganic methyl ester and in the second an inorganic ethyl ester, and observing the proportions underlying the present application, one may obtain mixed alkyl ethers of cellulosic bodies displaying the properties described herein.

Owing to their property of swelling up and even dissolving in cold water, whilst being insoluble in water at room termperature, the herein described alkyl ethers of cellulosic bodies are suitable for the production of articles that have to be impregnated or incorporated or otherwise combined with substances soluble in water, for example dyes. Thus, the herein described alkyl ethers of cellulose are especially suitable for the manufacturing of artificial filaments and threads, such as artificial silk, artificial hair and the like.

The herein described alkyl ethers of cellulosic bodies are furthermore suitable for the production of all such articles as must be insoluble in water at room temperature but as are preferably and more economically produced in aqueous solutions, for instance photographic emulsions, photographic layers sensitive to light, coatings of all kinds, dressings, fillings and finishings for textiles, paper, leather and the like, sizing for spun goods, printing agents and compositions, thickening agents for the same, agents for fixing pigments, adhesives, cements, glues, adhesive pastes, sizes for paper, photographic lacquers, varnishes and paints for general purposes, membranes, artificial leather, book cloth, etc.

For the aforesaid uses, the herein described alkyl ethers of cellulosic bodies may be combined with water-soluble cellulose derivatives (such as viscose, cuprammonium cellulose and the like) or with water-insoluble cellulose derivatives (such as nitro-celluloses, acetyl-celluloses, formyl-celluloses and the like), or with other water-insoluble or water-soluble colloids, binding agents, thickening agents (such as starch, dextrine, British gum, glue (gelatine), albumen, casein, tragasol, gum tragacanth, caoutchouc, guttapercha, balata, resins of all kinds, condensation products of phenols with aldehyde, waxes, paraffins, etc.), softening or plasticizing agents (such as glycerin, soaps, sugars, Turkey red oil, camphor, naphthalene, phosphoric acid esters of the phenols, drying and non-drying oils, fats and fatty acids, metal compounds of fatty acids, balsams, etc.).

The expression "cellulosic body" wherever it occurs, means: cellulose itself, cellulose-containing materials, conversion products of cellulose (such as cellulose hydrates, hydrocelluloses, oxycelluloses or the like) and cellulose derivatives.

I claim:

1. Process for making ethyl derivatives of cellulose or its conversion products, which are insoluble in water at 16° C. and above, but are affected in water at some temperature below 16° C., which comprises treating an ethyl derivative of a cellulosic body soluble in water at 16° C., with a caustic alkali and an ethylating agent, while the content by weight of the reaction mixture in caustic alkali is not less than one-tenth and not more than one-fourth of the quantity of the water contained in the reaction mass.

2. Process for making ethyl derivatives of cellulose or its conversion products, which are insoluble in water at 16° C. and above, but are affected in water at some temperature below 16° C., which comprises treating a reaction mixture from the production of ethyl cellulose which is soluble in water at 16° C., and containing such an ethyl cellulose, water, and other reaction products soluble in water at 16° C., with a caustic alkali and an ethylating agent, while the content by weight of the reaction mixture in caustic alkali is not less than one-tenth and not more than one-fourth of the quantity of the water contained in the reaction mass.

3. In the process according to claim 1, the improvement which comprises treating with an ethylating agent, a reaction mixture containing the ethyl ether of a cellulosic body soluble in water at 16° C., such mixture containing for each part by weight of dry ethyl cellulose soluble in water at 16° C., 2 to 5 parts by weight of water and between 0.3 and 1 part by weight of caustic alkali.

4. In the process according to claim 1, the improvement which comprises treating with an ethylating agent, a reaction mixture containing an ethyl ether of a cellulosic body, which is soluble in water at 16° C., which reaction mixture contains to each part by weight of dry ethyl cellulose soluble in water at 16° C., from 5 to 10 parts by weight of water and not less than 0.75 and not more than 2.5 parts by weight of caustic alkali.

5. In the process according to claim 1, the improvement which comprises treating with an ethylating agent, a reaction mixture containing an ethyl ether of a cellulosic body, which is soluble in water at 16° C., and containing such an ethyl cellulose, water, and other reaction products.

6. In the process of claim 1, the improvement which comprises adding the caustic alkali and the ethylating agent in successive portions, while maintaining the stated ratio between water and caustic alkali.

7. A process of making alkyl derivatives of cellulose or its conversion products, which are insoluble in water at 16° C. and above, but are affected in water at some temperature below 16° C., which comprises treating an alkyl derivative of a cellulosic body soluble in water at 16° C., with a caustic alkali and an alkylating agent, while the content by weight of the reaction mixture in caustic alkali is not less than one-tenth and not more than one-fourth of the quantity of the water contained in the reaction mass.

8. A process for making alkyl derivatives of cellulose or its conversion products, which are insoluble in water at 16° C. and above, but are affected in water below about 10° C., which comprises treating a reaction mixture from the production of alkyl cellulose which is soluble in water at 16° C., and containing such an alkyl cellulose, water, and other reaction products soluble in water at 16° C., with a caustic alkali and an alkylating agent, while the content by weight of the reaction mixture in caustic alkali is not less than one-tenth and not more than one-fourth of the quantity of the water contained in the reaction mass.

9. In the process according to claim 1, the improvement which comprises treating with an ethylating agent, a reaction mixture containing an ethyl ether of a cellulosic body, which is soluble in water at 16° C., which reaction mixture contains to each part by weight of dry ethyl cellulose soluble in water at 16° C., from 10 to 20 parts by weight of water and not less than 2 and not more than 5 parts by weight of caustic alkali.

10. Alkyl ethers of cellulosic bodies, which are insoluble in water at above 16° C., but which swell in water below about 10° C., and which are soluble in many organic solvents.

11. Alkyl ethers of cellulosic bodies, insoluble in water at 16° C. and above, but capable of substantially swelling in water at from 5 to 8° C.

12. Alkyl ethers of cellulosic bodies, insoluble in water at 10° C. and above, but capable of substantially swelling in water at from 1 to 5° C.

13. Alkyl ethers of cellulosic bodies, which are insoluble in water at 16° C., and above, such ethers swelling substantially in water at some temperature substantially below 16° C.

14. Ethyl ethers of cellulosic bodies, which are insoluble in water at above 16° C., but which swell in water below about 10° C., and which are soluble in many organic solvents.

15. Ethyl ethers of cellulosic bodies, insoluble in water at 16° C., and above but capable of substantially swelling in water at from 5 to 8° C.

16. Ethyl ethers of cellulosic bodies, insoluble in water at 10° C. and above, but capable of substantially swelling in water at from 1 to 5° C.

17. Ethyl ethers of cellulosic bodies, which are insoluble in water at 16° C. and above, such ethers swelling substantially in water at some temperature substantially below 16° C.

18. An ethyl ether of a cellulosic body, which is insoluble in water at 16° C., and above, but which is somewhat soluble in water at temperatures of about 0° to 5° C., which product can be made by treatment of an ethyl derivative of a cellulosic body soluble in water at 16° C., either alone or in the form of reaction mixtures which contain such an ethyl cellulose, with caustic alkali and an ethylating reagent in the presence of a quantity of caustic alkali which amounts to not less than one-tenth and not more than one-fourth of the quantity of the water contained in the reaction mixture.

19. An ethyl ether of a cellulosic body, which is insoluble in water at 16° C., and above, but which swell perceptibly in water at between 5 and 10° C., which product can be made by treatment of an ethyl derivative of a cellulosic body soluble in water at 16° C., either alone or in the form of reaction mixtures which contain such an ethyl cellulose, with caustic alkali and an ethylating reagent in the presence of a quantity of caustic alkali which amounts to not less than one-tenth and not more than one-fourth of the quantity of the water contained in the reaction mixture.

In testimony whereof I affix my signature in presence of two witnesses.

LEON LILIENFELD.

Witnesses:
 CARL SOUDEMKY,
 CARL JERESIZOK.